United States Patent
Iwaniec et al.

(10) Patent No.: US 12,026,043 B2
(45) Date of Patent: Jul. 2, 2024

(54) METHOD AND DEVICE FOR DETECTING DYSFUNCTION OF VEHICLE EMBEDED COMPUTER USING DIGITAL IMAGES

(71) Applicant: Aptiv Technologies AG, Schaffhausen (CH)

(72) Inventors: Michal Iwaniec, Cracow (PL); Grzegorz Jablonski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 187 days.

(21) Appl. No.: 17/660,346

(22) Filed: Apr. 22, 2022

(65) Prior Publication Data

US 2022/0342667 A1 Oct. 27, 2022

(30) Foreign Application Priority Data

Apr. 23, 2021 (EP) .................................. 21170292

(51) Int. Cl.
 *G06F 11/07* (2006.01)
(52) U.S. Cl.
 CPC ...... *G06F 11/0781* (2013.01); *G06F 11/0739* (2013.01)
(58) Field of Classification Search
 CPC ............. G06F 11/0781; G06F 11/0739; G06F 11/3013; G06F 11/3072; G06F 11/3447; G06F 11/3452; G06F 11/3457; G05B 23/0221; G05B 23/0224; G05B 23/0243
 See application file for complete search history.

(56) References Cited

U.S. PATENT DOCUMENTS

| | | | |
|---|---|---|---|
| 6,959,265 B1* | 10/2005 | Candela | G06F 11/3452 702/182 |
| 7,954,090 B1* | 5/2011 | Qureshi | G06N 5/048 714/48 |
| 8,306,931 B1 | 11/2012 | Bowman et al. | |
| 2003/0114965 A1 | 6/2003 | Fiechter et al. | |
| 2017/0097980 A1* | 4/2017 | Ishii | G06N 20/00 |
| 2017/0250855 A1 | 8/2017 | Patil et al. | |
| 2019/0095266 A1* | 3/2019 | Chen | G06N 20/00 |
| 2019/0213099 A1 | 7/2019 | Schmidt et al. | |

(Continued)

OTHER PUBLICATIONS

"Extended European Search Report", EP Application No. 21170292.3, Oct. 19, 2021, 10 pages.

*Primary Examiner* — Gabriel Chu
(74) *Attorney, Agent, or Firm* — Harness, Dickey & Pierce, P.L.C.

(57) ABSTRACT

The present disclosure concerns a method to train, on a computing device, a machine-learning model adapted to determine a dysfunction of a monitored vehicle electronic control unit (ECU) or vehicle embedded computer. In aspects, the computing device stores, in a memory, historical data from a plurality of ECUs having a dysfunction. The historical data may include usage values over a period of time of at least one ECU resource by applications running on the ECUs. Further, the computing device may process the historical data to obtain two-dimensional training files. In implementations, each usage value may be linked with a specific application in a first dimension and a specific time in a second dimension. Still further, the computing device may train a machine-learning model with the training files.

16 Claims, 4 Drawing Sheets

(56) References Cited

U.S. PATENT DOCUMENTS

| | | | |
|---|---|---|---|
| 2019/0384662 A1* | 12/2019 | Bonnell | G06F 11/3072 |
| 2019/0394102 A1* | 12/2019 | Bandi | G06F 11/3452 |
| 2020/0341832 A1* | 10/2020 | Poghosyan | G06F 11/0793 |
| 2021/0089377 A1* | 3/2021 | Wang | G06F 11/0709 |
| 2023/0236922 A1* | 7/2023 | Nagar | G06F 11/3419 |
| | | | 714/48 |

* cited by examiner

S1 - STORING / RETRIEVING
- HISTORICAL DATA

S2 - PROCESSING
- HISTORICAL DATA TO 2-D TRAINING FILES

S3 - STANDARDIZING (OPTIONAL)
- 2-D TRAINING FILES TO A PREDETERMINED SIZE

S4 - TRAINING
- MACHINE LEARNING WITH THE TRAINING FILES

S5 - RECEIVING
- TELEMETRY DATA FROM A MONITORED ECU

S6 - PROCESSING
- TELEMETRY DATA TO 2-D MONITORING FILES

S7 - STANDARDIZING (OPTIONAL)
- 2-D MONITORING FILES TO THE PREDETERMINED SIZE

S8 - IDENTIFYING / PREDICTING
- A DYSFUNCTION IN THE TELEMETRY DATA THANKS TO MACHINE LEARNING

METHOD AND DEVICE FOR DETECTING DYSFUNCTION OF VEHICLE EMBEDED COMPUTER USING DIGITAL IMAGES

CROSS-REFERENCE TO RELATED APPLICATION(S)

This application claims priority to European Patent Application Number 21170292.3, filed Apr. 23, 2021, the disclosure of which is hereby incorporated by reference in its entirety herein.

BACKGROUND

Modern vehicles such as cars, trucks, buses, trains or motorbikes include a vehicle embedded computer or electronic control unit (ECU) that may perform various tasks such as engine control, brake control, infotainment, air conditioning, driving assistance, or autonomous driving.

Many ECUs operate securely and stably, rarely manifesting a dysfunction. Yet, in some ECUs, some dysfunctions do occur. In some scenarios, a dysfunction of an ECU in a vehicle can have detrimental consequences on a user's comfort or safety.

Since, dysfunctions may only sporadically appear in some commercial ECUs, using a machine-learning model on ECU telemetry data can be difficult due to the lack of, or inconsistency with, training data. In addition, a machine-learning framework which is used to develop machine-learning models can often be inflexible since every machine-learning model requires variable inputs.

SUMMARY

The present disclosure concerns a method to train, on a computing device, a machine-learning model adapted to determine (e.g., detect, predict) a dysfunction of a monitored vehicle electronic control unit (ECU) or vehicle embedded computer, the method including the steps of: storing, in a memory, historical data from a plurality of ECUs having a dysfunction, the historical data including usage values over a period of time of at least one ECU resource by applications running on the ECUs; processing, by a computing device, the historical data to obtain two-dimensional training files, wherein each usage value is linked with a specific application in a first dimension and a specific time in a second dimension; and training, by the computing device, a machine-learning model with the training files.

The present method allows an efficient training of a machine-learning model with training files in the form of, or similar to digital images. The machine-learning model may thus be adapted for image recognition which simplifies the present method. The training files may also be easier to manipulate, store and communicate, with regard to historical data files, for example as data-as-a-service.

In implementations, the historical data include historical data files having different periods of time and/or having different numbers of applications, the method including an additional step for standardizing the training files by scaling up or down at least part of the training files to a predetermined size of the first dimension and/or to a predetermined size of the second dimension.

The step of standardizing allows to bring heterogenous data from many different vehicles having different ECUs and different applications under a single format of training files. Consequently, the training step can be efficiently performed with a common machine-learning model. In addition, the processing step obtaining two-dimensional training files simplifies the standardizing step since usual scaling algorithms adapted for two-dimensional files such as digital images may be used with little or no modification.

In still further implementations, the step of processing the historical data includes obtaining two-dimensional training files having a predetermined size of a first dimension and/or a predetermined size of a second dimension. In some implementations, most or all the training files have a single predetermined size (e.g., a single size of the first dimension and a single size of the second dimension). This specific processing step enables the acquisition of ready-to-use training files in a single step but may be more difficult to implement than the standardizing step, for example in the case of highly heterogeneous historical data. The specific processing step may be performed in addition to the standardizing step, for example in the case of highly heterogenous historical data, for example from various sources.

In implementations, the historical data include usage values of at least two ECU resources and the step of processing the historical data includes obtaining multilayered two-dimensional training files, each layer including the two dimensions and the usage values of one of the at least two ECU resources. This enables a computing device to perform the training step on the basis of more ECU resources and render the trained model more efficient in determining (e.g., detecting, predicting) dysfunctions. The layers are, in some implementations, consistent in terms of applications and time intervals.

In implementations, the processing step of the historical data obtains training files as digital images: the training files may be processed during the processing step in a digital image format. Such digital images allow convenient manipulation of the historical data, and simplify the standardization step. They also allow an efficient visualization by human experts and usual machine-learning models adapted to pictures may be used with limited training.

In implementations, the digital images have each at least two image channels and each layer of the training files corresponds to an image channel. A multilayered training file may thus be manipulated and visualized as a picture.

The present disclosure further relates to training a machine-learning model adapted to determine (e.g., detect, predict) a dysfunction of a vehicle embedded computer or ECU, and a system including a hardware processor configured to perform the methods as described herein.

The present disclosure further concerns a method to determine (e.g., detect, predict) a dysfunction of a monitored vehicle ECU, the method including the steps of: receiving, by a computing device, telemetry data of the monitored vehicle ECU, the telemetry data including usage values of the at least one ECU resource by a plurality of applications running on the monitored vehicle ECU and storing the telemetry data in a memory; processing, by the computing device, the telemetry data to obtain two-dimensional monitoring files, wherein each usage value is linked with a specific application in a first dimension and a specific time in a second dimension and storing the two-dimensional monitoring files in the memory; and detecting or predicting, by the computing device, a dysfunction of the monitored vehicle ECU from the monitoring files by the machine-learning model according to the above method.

Such a method allows for the efficient detection or prediction of dysfunctions of a monitored vehicle ECU with limited processing resources and with a high accuracy, since the trained model may be light and efficient.

In implementations, the monitoring files have a different number of applications and/or a different period of time with regard to the training files, the method further including the step of standardizing the monitoring files by scaling up or down the monitoring files to the size of the first dimension and/or second dimension of the training files. This is advantageous in the case the monitored vehicle ECU produces telemetry data leading to monitoring files having a different size than the training files used for training the machine-learning model.

Alternatively or in combination, the step of processing the telemetry data includes obtaining two-dimensional monitoring files having a predetermined size of a first dimension and/or a predetermined size of a second dimension. In some implementations, the predetermined size of the first dimension and/or second dimension is identical to the respective sizes of the training files used for training the machine-learning model.

In implementations, the telemetry data includes usage values of at least two ECU resources, the step of processing the telemetry data includes obtaining multilayered two-dimensional training files, each layer including the two dimensions and the usage values of one of the at least two ECU resources. In this case, the monitoring files may be identical to the multilayered training files.

In implementations, the processing step of the telemetry data obtains monitoring files as digital images, which may be similar to the training files, e.g., under an identical format and with an identical resolution or size.

In implementations, the digital images have at least two image channels and each layer of the monitoring files corresponds to an image channel.

In implementations, the ECU resource may be selected from a list including a processor usage of the ECU, a memory usage of the ECU, a network usage of a network adaptor, a power consumption and a number of threads. The usage values of ECU resources are easily available in an ECU and are likely to reflect dysfunctions.

In implementations, the historical data and/or the telemetry data include error messages generated by the applications or the ECU system, wherein the error messages are included in the training files and/or in the monitoring files in order to supervise the training step of the machine-learning model. The training step and the detecting step may thus be more accurate and more efficient. The error messages may also be used as labels to perform a supervised training of the machine-learning model.

In implementations, the error messages are included in a layer of the multilayered two-dimensional training files and/or monitoring files, which allows to produce integrated training and/or monitoring files, ready to be used by the machine-learning model. Generally speaking, it is preferable that the monitoring files be in an identical format with regard to the training files.

The present disclosure further relates to a system to determine (e.g., detect, predict) a dysfunction of a monitored vehicle ECU, the system including a hardware processor configured to perform the above method. The system may be in some implementations embedded into the vehicle, for example as a monitoring module of the monitored vehicle ECU.

The present disclosure also relates to a non-transitory computer readable medium including program instructions for performing some or all the above method steps.

The present disclosure further concerns a computer file to store usage values over time of an ECU resources of a vehicle embedded computer or ECU by a plurality of applications running on said ECU, the computer file including a number p of (Km×Ln) matrixes wherein p is a number of resources, m is a number of different applications running on the ECU, n is a number of resource usage values over time and K and L are independent coefficient greater than zero.

Such a computer file may be generated by the processing step and/or the standardizing step discloses above. The computer file is an efficient way to store and process ECU data for training a machine-learning model and detecting dysfunctions in a monitored vehicle ECU and can be provided and distributed to computing systems within a data-as-a-service framework. The computer file can also be easily standardized or resized by changing the K and L coefficient. For example, K and L can be equal to 1 after the processing step and can be independently changed during the standardizing step.

The present disclosure further relates to a method to prepare data for machine learning, the method including the steps of: storing, in a memory, historical data from a plurality of ECUs having a dysfunction, the historical data including usage values over a period of time of at least one ECU resource by applications running on the ECUs; and processing, by a computing device, the historical data to obtain two-dimensional training files, wherein each usage value is linked with a specific application in a first dimension and a specific time in a second dimension.

Such a method allows to obtain convenient training files for machine learning, for example computer files as described above. Such training files may be stored in a memory, for example on-line and distributed on-demand, under data-as-a-service. This method to prepare data may include the advantageous aspects and additional steps presented above and may also be used on telemetry data to detect a dysfunction.

BRIEF DESCRIPTION OF THE DRAWINGS

Other features, purposes and advantages of the disclosure may become more explicit by means of reading the detailed statement of the non-restrictive implementations made with reference to the accompanying drawings.

DETAILED DESCRIPTION

The present disclosure relates to the general field of vehicle safety and monitoring and covers all kind of vehicle, in particular motor vehicles such as cars, heavy-duty vehicles, construction machines, trucks, buses, motorbikes and electric bicycles.

In the present disclosure, a vehicle ECU relates to an on-board computing system or part of a computing system including one or several processing units such as one or several processors and one or several memory units allowing to store data, libraries and applications. An ECU may include one module dedicated to a specific function or several modules dedicated to several specific functions, such as safety, comfort, infotainment, autonomous driving or driver assistance.

These functions may be performed by applications, including software running on the ECU and consuming ECU resources over time, such as processor resources, memory resources and network resources. The applications can also emit error messages. The usage values over time of the different ECU resources by the applications and optionally the error messages constitute a set of data, referred to as "historical data" when the data have been generated in the past or "telemetry data" when the data are generated in the present time, for example in real time or in the immediate past (e.g., few seconds or minutes ago).

A dysfunction may be defined in the present disclosure as a dysfunction identified by a human (e.g., a repair mechanic, a vehicle driver or user, or a remote expert) based on the vehicle or ECU functions and behavior. For example, one or more functions may become unavailable in the vehicle, permanently, temporarily or under specific circumstances. In addition, a dysfunction may be defined by or linked with one or several error messages reported by an application, for example a critical error message or a failure error message.

Figure 1:
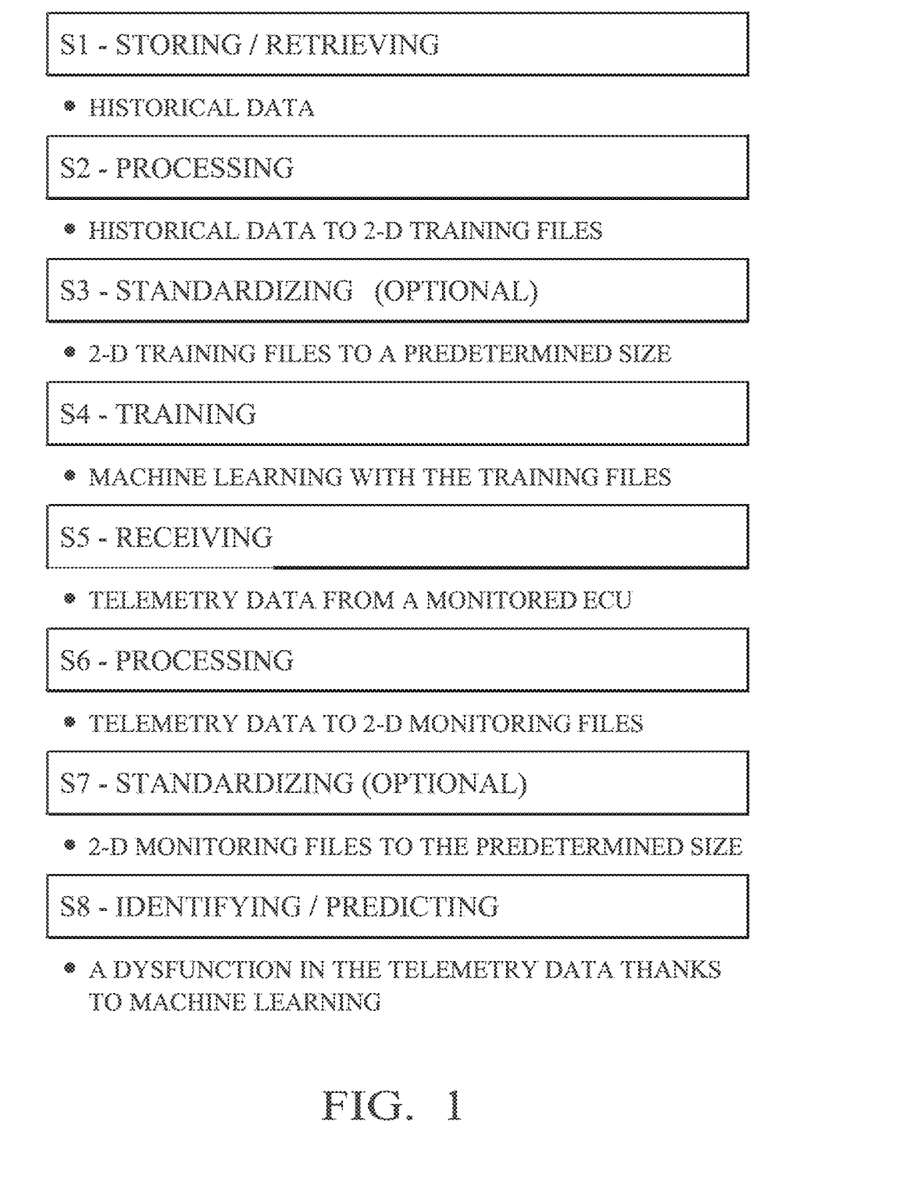
FIG. 1 illustrates a flow chart of a method to determine a dysfunction of a monitored vehicle ECU in accordance with one or more implementations.

FIG. 1 illustrates a flow chart of a method to determine a dysfunction of a monitored vehicle ECU in accordance with one or more implementations. In a first step S1, historical data may be stored under the form of databases or historical data files including usage values over a period of time of at least one ECU resource by applications that ran on the ECUs of a plurality of vehicles. These ECUs suffered from at least one dysfunction so that the historical data may have a temporal correlation with such a dysfunction. The dysfunction may have happened in the course of the vehicle usage or may have been triggered to generate relevant historical data.

The historical data being acquired, imported or extracted from a plurality of ECUs, these ECUs may be from different types and/or may have different configurations and may be part of different vehicles. Consequently, the historical data may be heterogeneous or inconsistent, with different applications or different numbers of applications, different periods of time and different sampling frequencies giving different numbers of usage values within the same period of time.

For example, a first type of ECU may have ten applications running, the usage data being acquired every second and the historical data include usage data during the last minute before a dysfunction. A second type of ECU may have seven applications running, the usage data being acquired every two seconds and the last three minutes of usage data before a dysfunction are stored or acquired. In addition, different ECUs resources may be acquired different periods of time and/or using different sampling frequencies.

The historical data may be acquired by any possible way, for example automatically by live or batch upload from the vehicle to an acquisition server in the cloud through a wireless connection, by a garage mechanic during a periodic maintenance of the vehicle or by the user of a vehicle, for example through a personal wireless device or computer. The historical data files may be obtained from different databases within an ECU or may be the databases.

In a second step S2, the historical data are processed to two-dimensional training files. For example, the raw data retrieved from the databases of the ECU are processed in a specific way so that each usage value corresponds to a specific application (first dimension) and a specific time (second dimension). The specific time is, in some implementations, a relative time, for example a time in a period of time covered by the training file, a set of training files or the historical data. In some implementations, the time can be a time count from the dysfunction or from an error message appearance.

Consequently, the processing step S2 may include a query step including a set of different queries to retrieve raw historical data in the historical data files or databases and a processing step to assemble or constitute the retrieved data in a training file having a two-dimensional structure.

Figure 2A:
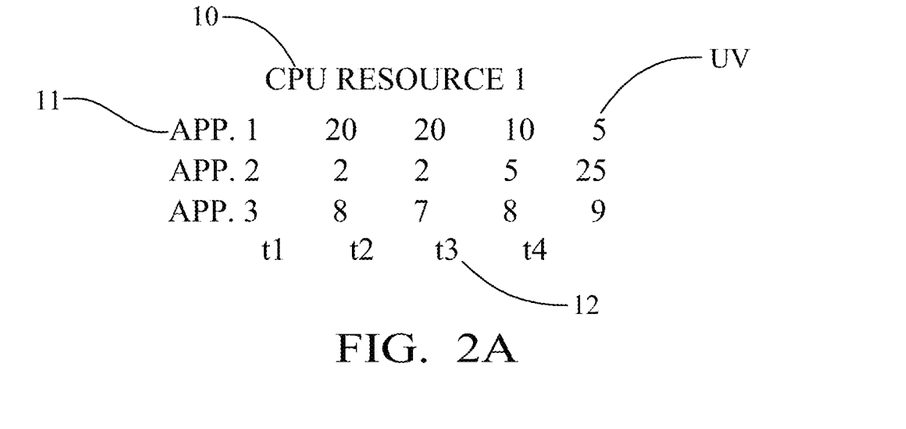
FIG. 2A illustrates an example of a two-dimensional training file for an ECU resource, in the form of a table, in accordance with one or more implementations.

FIG. 2A illustrates an example of a two-dimensional training file 10 for an ECU resource 1, in the form of a table, in accordance with one or more implementations. The usage values are provided in percentage of the total capacity of the specific ECU resource, for example percentage of memory occupation. The lines of the table (first dimension 11) correspond to the different applications that ran on the corresponding ECU of the plurality of ECUs. More than one line may be attributed to one application. The columns of the table correspond to time, or the time at which each usage value was acquired. In some implementations, the usage value may be expressed by with a range from 0 to 1, from 0 to 255 or by any other significant range, for example in hexadecimal or binary.

Figure 2B:
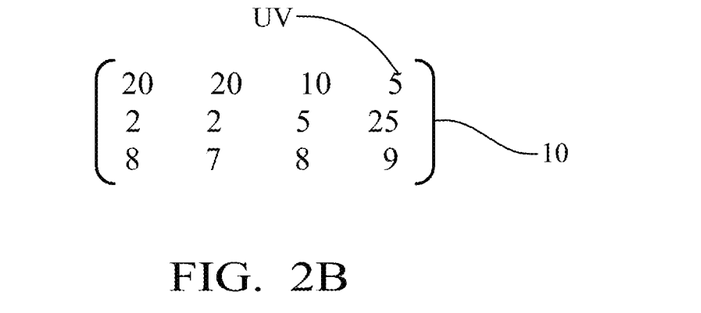
FIG. 2B illustrates an example training file for an ECU resource, in the form of a matrix, in accordance with one or more implementations.

FIG. 2B illustrates an example training file for an ECU resource, in the form of a matrix, in accordance with one or more implementations. In this case, the matrix may have a (Km×n) dimension, in which m is the number of different applications and n the number of different time intervals of the usage data and K is a coefficient greater than zero.

Figure 2C:
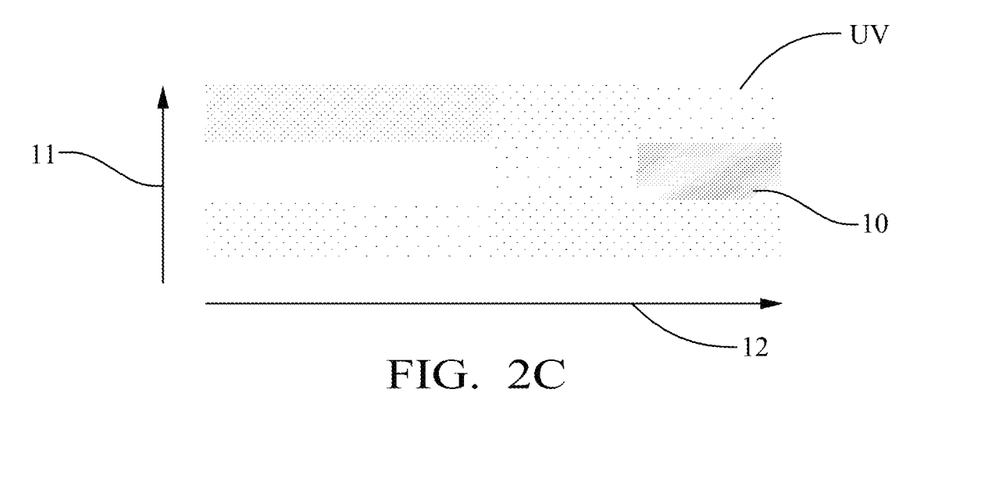
FIG. 2C illustrates an example training file for an ECU resource, in the form of a digital image file, in accordance with one or more implementations.

FIG. 2C illustrates an example training file for an ECU resource, in the form of a digital image file, in accordance with one or more implementations. In this case, each usage value may be seen as a pixel or a group of pixels, for example a square of 5×5 pixels and the first dimension 11 and second dimension 12 are the coordinate of each pixel or each group of pixels in the digital image. The resolution of such a digital image is thus the number of applications or a multiple of the number of application times the number of time intervals or a multiple of this number. The intensity of each pixel may correspond to the usage value, for example on a grayscale, the higher the usage value the darker the corresponding pixel or the contrary.

Processing the training files as a digital image may also allow to export it as any of a variety of files, including a joint photographic experts group (JPEG) file or a portable network graphics (PNG) file, in order for a human to visualize the historical data. However, the three above representations of the historical files may be digitally equivalent, and the historical files are in some implementations binary files.

The processing step S2 may organize the applications and the time intervals in the two-dimensional in a specific, predetermined order, to obtain consistent first and second dimensions within the full set of training files. For example, the valuers of time intervals (e.g., the values of the second dimension) are recalculated from the first or the last time interval, from an error message occurrence or from a predetermined origin.

In the case the historical data include usage values of several ECU resources, the usage values of each ECU resources may be stored in a different layer of a training file including several 2-dimensional layers. Further, an additional layer may also include error messages generated by the corresponding application over time. The usage values may thus be 1 in the case of an error message and 0 in the case of no error message, or any other values.

However, applications may also communicate various error messages and it is possible to classify the criticality of the error messages, for example manually by an expert or automatically thanks to an algorithm. In this case, the usage values can be zero (0) for no error message, one (1) for a normal error message, and two (2) for a critical error message. Additional criticality levels can also be envisaged.

The different layers may be concatenated or superposed one on the other in the training files by the processing of step S2. The different layers may be fused in a digital image-type training file, as detailed below.

Figure 3A:
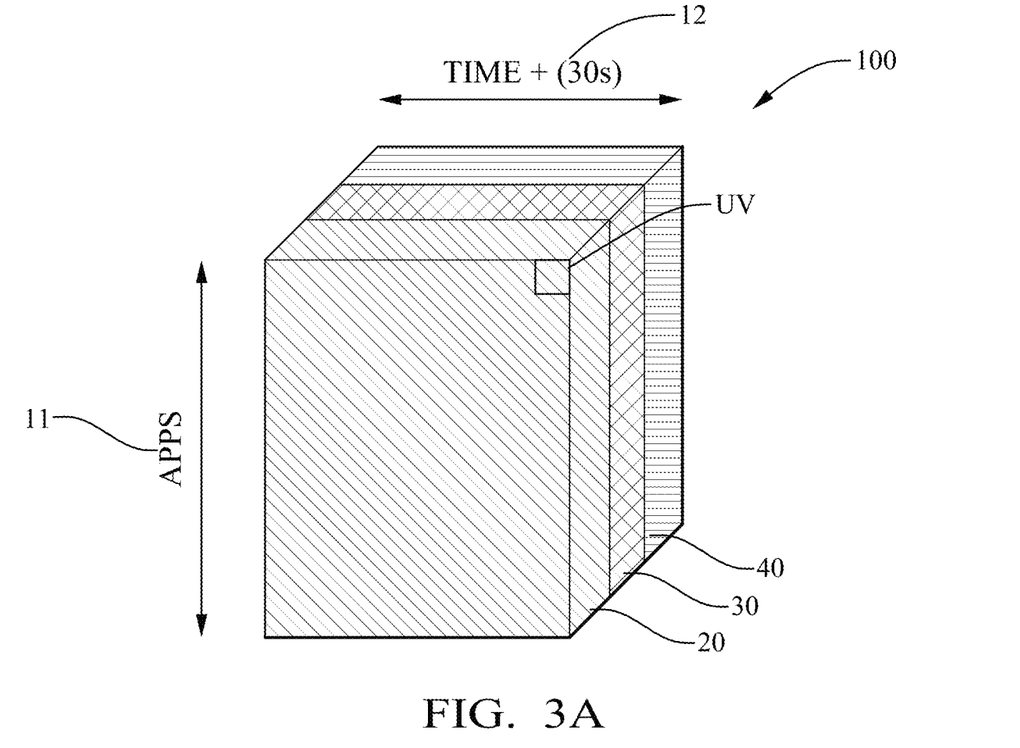
FIG. 3A illustrates a schematic of a multilayered training file in accordance with one or more implementations.

FIG. 3A illustrates a schematic of a multilayered training file in accordance with one or more implementations. As illustrated, an example of a training file 100 including three layers 20, 30, 40: one layer 20 is assigned to processor usage as a first ECU resource, one layer 30 is assigned to memory usage as a second ECU resource and one layer 40 is assigned to error messages. As many layers or image channels as they are ECU resources in the historical data may be used, while digital images with more than three or four channels can be represented under the form of a 3D file, such as an image with a depth, a relief or a topography and/or an image with different layers similarly to a digital map.

In the case of a representation as a digital image, each layer may be assigned to a specific image channel, for example one color of the RGB channel or an image channel of the type of YUV (e.g., luma) or hue, saturation, and value (HSV). The intensity of the usage value or pixel of each channel may be standardized and/or coded into 8 bits or 16 bits. If more than three ECU resources are available in the historical data, then an alpha channel can also be used.

Figure 3B:
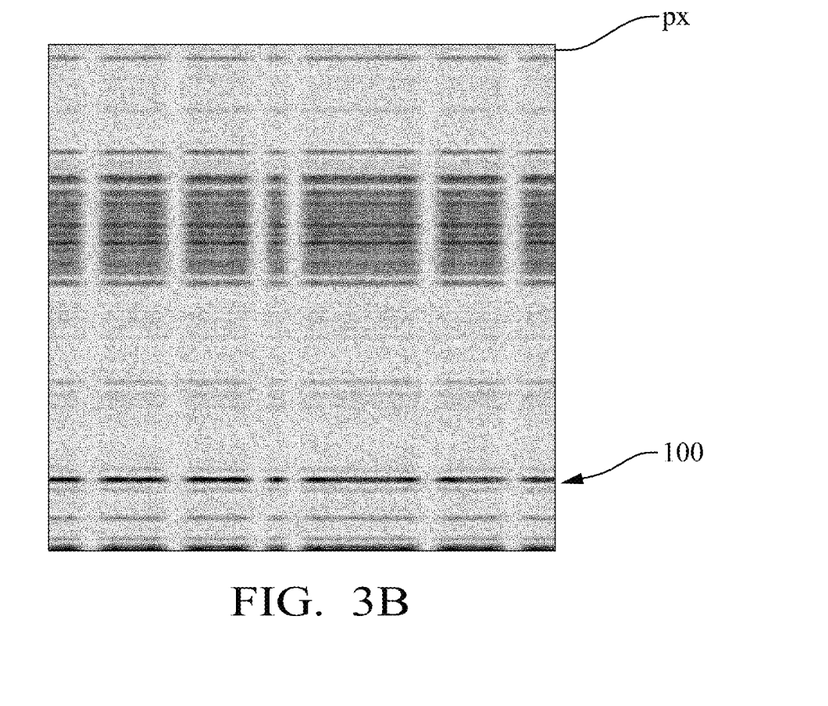
FIG. 3B illustrates a training file represented as a color digital image in accordance with one or more implementations.

FIG. 3B illustrates a training file represented as a color digital image in accordance with one or more implementations. As illustrated, a training file represented as a color digital image in accordance with one or more implementations. FIG. 3B shows the training file 100 represented as a color digital image. Each pixel 'px' of the training file 100 thus results from the superposition of the usage values of each layer 20, 30, 40 affected to an image channel. For example, the image of FIG. 3B is RGB and processor usage has been assigned to channel (R), memory usage has been assigned to channel (G) and error messages have been assigned to channel (B). The training file 100 of FIG. 3B may be a "picture" of an ECU state on a given time frame.

In some implementations, each layer has a same size, e.g., the same number of applications (first dimension), the same number of time intervals (second dimension) and thus the same number of usage values. The different layers within a training file may thus have consistent first dimensions and second dimensions. However, it is possible that some layers may have a different first dimension and/or second dimension, depending on how the historical data have been acquired or processed. In this case, each layer relating to a given ECU resource may be consistent within the set of training files.

Additional processing may also be performed in the step S2, for example to add or remove comments, headers, scales or other unnecessary values. Additional labels may also be introduced for supervised machine learning for example in addition or in some implementations to the error messages. The different applications may also be disposed in a specific order, for example from top to bottom.

In some implementations, the processing step may allow to obtain training files with a predetermined size, regardless of the number of applications, the period of time and/or the sampling frequency of the historical data file. For example, the processing step may allow to extract or process data from different databases or different historical files so that most or all the training files have a single predetermined size of the first dimension and/or a single predetermined size of the second dimension.

This may be performed by disregarding some usage values corresponding to undesired or unnecessary applications or time intervals. The desired or necessary applications may be selected by a human engineer or by an algorithm on the basis of technical criteria. For example, if first historical data files comprise 100 time intervals in the first dimension over a certain period of time and second historical data files include 200 time intervals over the same period of time, the usage value of one time interval every two time intervals may be selected from the second historical data file to obtain training files with 100 time intervals.

Extrapolating the usage values of the first historical data file is also possible to obtain a 200-time interval training file, if desired. The same selection or extrapolation can be performed for the first dimension in the processing step S2.

The processing step S2 may be performed once, continuously with a stream of incoming historical data or by batch. The training files may be stored in a memory, for example on a server in the cloud and be available on demand to on-board and/or off-board computing systems, for example through a data-as-a-service framework or system.

Alternatively or in combination, in an optional step S3, at least part of the training files are standardized to a predetermined size. For example, training files deriving from ECUs having thirty applications may be reduced to twenty-five applications and the training files covering ten minutes may be reduced to eight minutes. Such a standardization step may be performed by scaling up or down some of the training files or cropping some of the training files, so that all the training files have a same predetermined size or resolution.

The standardization step is especially relevant in the case a basic processing step S2 has been performed, e.g., if the processing step S2 did not allow to obtain training files having all a predetermined size. This may be the case if only limited power or processing resources were available for the processing step, if the historical files are obtained from various sources using different processing steps and/or if the historical data are highly heterogenous.

The standardization step may be performed by well-known algorithms or tools applicable to digital images, thanks to the two-dimensional format of the training files obtained in step S2. In the case of a multilayered training files, the same standardization step may be applied to one or several of the layers, so that all the layers have a same predetermined size or resolution, similarly to a digital image. The standardizing step generally allows to obtain homogenous training files.

In a step S4, a machine-learning model is trained with the training files obtained by the processing step or the standardizing step. The machine-learning model can be any model applicable to machine learning but is, in some implementations, a machine-learning model adapted for image recognition, for example a neural network such as a convolutional neural network (CNN). Some layers or some neurons of the neural network may be pre-trained, for example from open-source projects dedicated to image recognition and only the input layer and/or the output layer may be trained, which accelerates the training step and reduces power and computing resources consumption.

The training step S4 can be a non-supervised training, for example if only historical files relating to ECUs having a dysfunction have been selected. In some implementations, the training step S4 is supervised, thanks to the error messages contained in a layer of the training files and/or additional labels introduced during the processing step S2. It is thus also possible to automatically or manually tag or label historical files or training files linked with one or several dysfunctions.

Figure 4:
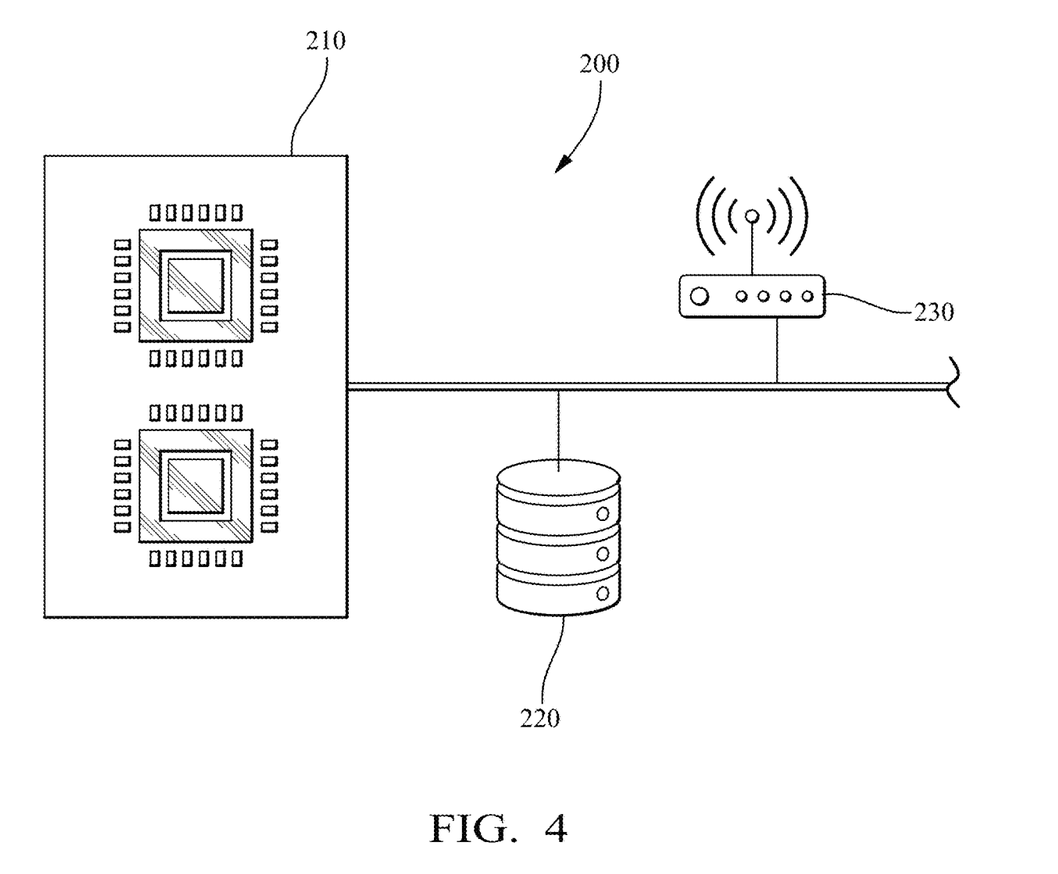
FIG. 4 illustrates a schematic computing system to perform the steps or part of the steps of the present disclosure in accordance with one or more implementations.

FIG. 4 illustrates a schematic computing system to perform the steps or part of the steps of the present disclosure in accordance with one or more implementations. The steps S1 to S4 are in some implementations performed off board, for example by a specialized computing system 200 of FIG. 4 including a processor unit 210 with one or more processor, a memory unit 220 and a network adapter 230, as it is known by the skilled person. Any other interface, screen or input device may also be provided. In particular, the memory unit may store the historical data in step S1 and the training files obtained from step S2 and/or S3, at least temporarily. The processing unit 210 may include regular processing units adapted to perform steps S2 and S3 and machine learning units specially adapted to perform step S4.

Once step S4 has been performed, the machine-learning model is trained and can be used to detect or predict one or several dysfunctions from the telemetry data of a monitored vehicle ECU. The trained model can be used on the same computing device 200 as in step S4 or on a different computing device. For example, the trained model can be used on a cloud server or in a vehicle ECU, for example a dedicated monitoring module of a monitored vehicle ECU. The trained model can also be used through an application of a wireless device or computer, for example by a repair mechanic or by a vehicle's user.

In a step S5, telemetry data from a monitored vehicle ECU is received, for example sent through a wireless communication by a wired connection or a wireless module of the monitored vehicle ECU or through a wireless device or a computer to a cloud server performing steps S5 to S8. In some implementations, a module of the monitored vehicle ECU may perform the steps S5 to S8 and may receive the telemetry data by an on-board network or a direct memory connection.

In a step S6, telemetry data are processed in two-dimensional monitoring files, similarly to step S2, and possibly to multilayered monitoring files. Consequently, the monitoring file may have the same structure as the training file, e.g., layers corresponding of the same ECU resources and the same or similar applications in the same order. In some implementations, the monitoring files have also the same size, e.g., the same first dimension and second dimension as the training files.

In an optional step S7, the monitoring files may be standardized, similarly to step S3. This standardization step is not required if the monitoring file obtained in step S6 have a size or dimensions similar to the training files used to train the machine-learning model in step S4.

However, it is possible that the monitored vehicle ECU has a different number of applications and/or a different period of time and/or a different sampling frequency of the usage values, and that the processing step did not produce monitoring files having a size identical to the training files and it may be required to standardize the monitoring files. Thanks to the optional step S7, the monitoring file may have the same size as the training file, in order to be efficiently processed by the trained model.

In a step S8, the learning model trained in step S4 may be used to determine (e.g., infer, detect, identify, predict) a dysfunction of the monitored vehicle ECU from the monitoring files (e.g., from the telemetry data transformed by step S6 and possibly step S7).

The step S8 requires less processing power with regard to step S4. Consequently, steps S5 to S8 can be performed on a computing device different from the computing device used for steps S1 to S4, in particular an embedded computing module of an ECU or wireless device of a user. Program instructions to perform part or all the above steps may be stored in a storage module related to the vehicle, such as volatile memory (e.g., ROM, RAM) and/or non-volatile memory, (e.g., Flash, NAND) that is permanently or removably integrated in the vehicle or connectable to the vehicle (e.g., via the 'cloud') and can be executed by a computer, or a calculator, of the vehicle, such as one or more modules of the ECU.

Once a dysfunction is detected or predicted, correcting actions may be taken, for example by turning off non-critical applications of the monitored vehicle ECU, in particular applications that do not relate to safety or direction control or engine control. In the case an application involved in safety is about to dysfunction, or the whole ECU is about to fail, then the corresponding vehicle may be driven in a safe place, in the case of an autonomous or semi-autonomous vehicle.

An alert message can be sent to the user, to the manufacturer of a vehicle, to local authorities or to a cloud platform, to inform that a dysfunction occurred or is about to occur and to trigger responding actions.

The present method may also allow to classify dysfunctions or error messages, for example by using external labels introduced in the training files for a supervised training step of the machine-learning model. Consequently, errors emitted by applications may also be recognized and classified by a trained model, in order to trigger appropriate action in accordance with the criticality level of the error message.

What is claimed is:

1. A method comprising:
storing, in a memory of a computing device, historical data from a plurality of electronic control units (ECUs) having one or more dysfunctions, the historical data including usage values over a period of time of respective ones of a plurality of ECU resources by applications running on a respective one of the plurality of ECUs, the plurality of ECU resources including at least processor usage and memory usage;
processing, by the computing device, the historical data to generate three-dimensional training files from digital images having pixels such that coordinates of the pixels in a first dimension are associated with respective ones of the applications, coordinates of the pixels in a second dimension are associated with a runtime for the respective ones of the applications, and each of the pixels has a plurality of channels representing respective ones of a plurality of layers in a third dimension, the plurality of layers including at least a first layer representing the processor usage of each of the applications and a second layer representing the memory usage of each of the applications such that the layers are arranged to correlate the processor usage with the memory usage over the period of time, and intensities of the plurality of channels of the pixels are set to correspond to one of the usage values of the respective ones of the plurality of ECU resources utilized by the applications running on the respective one of the plurality of ECUs at the runtime; and training, by the computing device, a machine-learning model with the three-dimensional training files to determine a dysfunction of a monitored vehicle ECU.

2. The method as described in claim 1, wherein the historical data include historical data files having different periods of time.

3. The method as described in claim 1, wherein the historical data include historical data files having different numbers of applications.

4. The method as described in claim 1, further comprising:
standardizing the three-dimensional training files by scaling up or down at least part of the training files to a predetermined size of the first dimension; or
standardizing the three-dimensional training files by scaling up or down at least part of the three-dimensional training files to a predetermined size of the second dimension.

5. The method as described in claim 1, wherein the three-dimensional training files have a predetermined size in the first dimension.

6. The method as described in claim 1, wherein the three-dimensional training files have a predetermined size in the second dimension.

7. The method as described in claim 1, wherein the plurality of layers further includes one or more of a third layer representing a network usage of a network adaptor, a fourth layer representing a power consumption, and a fifth layer representing a number of threads.

8. The method as described in claim 1, wherein the historical data includes an error message generated by the applications, and wherein the error messages are included in a third layer of the plurality of layers in the three-dimensional training files in order to supervise the training of the machine-learning model.

9. The method of claim 1, wherein the intensities of the plurality of channels include at least 8 bits of data such that, over the period of time, the processor usage and the memory usage vary between at least 0 to 255.

10. A method comprising:
receiving, by a computing device, telemetry data of a monitored vehicle ECU, the telemetry data including usage values over a period of time of respective ones of a plurality of ECU resources by a plurality of applications running on the monitored vehicle ECU and storing the telemetry data in a memory, the plurality of ECU resources including at least processor usage and memory usage;
processing, by the computing device, the telemetry data to generate three-dimensional monitoring files from digital images having pixels such that coordinates of the pixels in a first dimension are associated with respective ones of the applications, coordinates of the pixels in a second dimension are associated with a runtime for the respective ones of the applications, and each of the pixels has a plurality of channels representing respective ones of a plurality of layers in a third dimension, the plurality of layers including at least a first layer representing the processor usage of each of the applications and a second layer representing the memory usage of each of the applications such that the layers are arranged to correlate the processor usage with the memory usage over the period of time, and intensities of the plurality of channels of the pixels are set to correspond to one of the usage values of the respective ones of the plurality of ECU resources utilized by the applications running on the monitored vehicle ECU at the runtime; and determining, by the computing device, a dysfunction of the monitored vehicle ECU from the three-dimensional monitoring files input into a machine-learning model trained to determine the dysfunction of the monitored vehicle ECU.

11. The method as described in claim 10, wherein determining the dysfunction of the monitored vehicle ECU is effective to determine a present or future dysfunction.

12. The method as described in claim 10, further comprising:
standardizing the three-dimensional monitoring files by scaling up or down at least one of the three -dimensional monitoring files to a size of the first dimension or the second dimension of the three-dimensional monitoring files.

13. The method as described in claim 10, wherein the plurality of layers further includes one or more of a third layer representing a network usage of a network adaptor, a fourth layer representing a power consumption, and a fifth layer representing a number of threads.

14. The method of claim 10, wherein the intensities of the plurality of channels include at least 8 bits of data such that, over the period of time, the processor usage and the memory usage vary between at least 0 to 255.

15. A system comprising:
one or more processors; and
a memory coupled to the one or more processors, the memory storing one or more programs configured to be executed by the one or more processors, the one or more programs including instructions that, when executed by the one or more processors, cause the one or more processors to:
store, in a memory of a computing device, historical data from a plurality of electronic control units (ECUs) having a dysfunction, the historical data including usage values over a period of time of respective ones of a plurality of ECU resources by applications running on a respective one of the plurality of ECUs, the plurality of ECU resources including at least processor usage and memory usage;
process, by the computing device, the historical data to generate three-dimensional training files from digital images having pixels such that coordinates of the pixels in a first dimension are associated with respective ones of the applications, coordinates of the pixels in a second dimension are associated with a runtime for the respective ones of the applications, and each of the pixels has a plurality of channels representing respective ones of a plurality of layers in a third dimension, the plurality of layers including at least a first layer representing the processor usage of each of the applications and a second layer representing the memory usage of each of the applications such that the layers are arranged to correlate the processor usage with the memory usage over the period of time, and intensities of the plurality of channels of the pixels are set to correspond to one of the usage values of the respective ones of the plurality of ECU resources utilized by the applications running on the respective one of the plurality of ECUs at the runtime; and train, by the computing device, a machine-learning model using the digital images as the three-dimensional training files to determine the dysfunction of a monitored vehicle ECU.

16. The system of claim 15, wherein the intensities of the plurality of channels include at least 8 bits of data such that, over the period of time, the processor usage and the memory usage vary between at least 0 to 255.

* * * * *